United States Patent [19]

Hurlburt

[11] Patent Number: 5,255,931
[45] Date of Patent: Oct. 26, 1993

[54] TRACTOR BALLAST MOUNTED TO FRONT AXLE OF COMPOUND STEERING APPARATUS FOR TRACTORS

[75] Inventor: Joseph C. Hurlburt, Lancaster, Pa.

[73] Assignee: Ford New Holland, Inc., New Holland, Pa.

[21] Appl. No.: 919,326

[22] Filed: Jul. 27, 1992

[51] Int. Cl.⁵ .................. B62D 5/26; B62D 7/16; B60S 11/00
[52] U.S. Cl. ..................... 280/97; 280/759; 180/79.4; 180/156; 180/266
[58] Field of Search .............. 280/759, 758, 757, 97, 280/113, 117, 98, 109, 112.2, 772; 180/79.4, 156, 266, 265

[56] References Cited

U.S. PATENT DOCUMENTS

| | | | |
|---|---|---|---|
| 3,016,987 | 1/1962 | Williamson | 280/97 X |
| 3,027,963 | 4/1962 | Nicholson | 280/97 X |
| 3,370,670 | 2/1968 | Love | 180/266 X |
| 3,635,493 | 1/1972 | Barth et al. | 280/759 |
| 4,471,975 | 9/1984 | Sorlie et al. | 280/759 |
| 4,688,823 | 8/1987 | Hanses | 280/759 |
| 5,046,577 | 9/1991 | Hurlburt | 280/97 X |
| 5,129,477 | 7/1992 | Hurlburt | 280/97 X |

FOREIGN PATENT DOCUMENTS

| | | | |
|---|---|---|---|
| 1916996 | 11/1978 | Fed. Rep. of Germany | 280/759 |
| 0420495 | 10/1974 | U.S.S.R. | 280/759 |
| 0001026 | 11/1979 | World Int. Prop. O. | 280/759 |
| 0007545 | 8/1989 | World Int. Prop. O. | 280/97 |

Primary Examiner—Margaret A. Focarino
Assistant Examiner—Peter English
Attorney, Agent, or Firm—Larry W. Miller; Frank A. Seemar

[57] ABSTRACT

A tractor having a front axle that pivotally moves laterally in response to a corresponding steering action of the steerable wheels mounted on the front axle is disclosed wherein the ballast assembly is supported directly by the front axle so as to be laterally movable relative to the chassis with the shiftable front axle. The ballast assembly is formed by individual weights mounted on an arcuate rack detachably connected to the front axle. The individual weights are connected together by fasteners to form a unitary package positioned centrally between the steerable wheels.

13 Claims, 5 Drawing Sheets

TRACTOR BALLAST MOUNTED TO FRONT AXLE OF COMPOUND STEERING APPARATUS FOR TRACTORS

BACKGROUND OF THE INVENTION

This invention relates generally to a steering mechanism for an agricultural tractor in which the front axle is laterally shiftable in response to a steering movement of the steerable wheels and, more particularly, to a ballast assembly for such laterally shiftable front axle steering mechanisms to maintain proper weight distribution on the steerable wheels as the front axle shifts laterally.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Although supplemental driving power is often provided to the steerable ground engaging wheels, a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse extension of the cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited to a given turning angle. This maximum turning angle defines the minimum turning radius of the tractor for a given wheel base length and tread spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length.

Traditionally, the front of the tractor is provided with added ballast or weights to improve weight distribution for the tractor during its operation and, thereby, increase traction for the front steerable wheels. Such weights are normally mounted in a detachable manner to the forward part of the tractor chassis; however, for tractors in which the front axle would shift laterally relative to the chassis, such chassis mounted weights would become unevenly distributed to the steerable wheels since one steerable wheel moves closer to the weights than the other steerable wheel.

It would, therefore, be desirable to provide a ballast assembly usable with a tractor having a laterally shiftable front axle that would maintain a positional relationship between the ballast and the front wheels to which the weight is distributed. Such ballast could be formed from individual weights to create an arcuate ballast assembly with the center of gravity thereof being spaced further away from the front axle than previously known.

SUMMARY OF THE INVENTION

It is an object of this invention to overcome the aforementioned disadvantages of the prior art by providing a ballast assembly mounted on the laterally shiftable front axle of a tractor equipped with a compound steering apparatus.

It is another object of this invention to provide a tractor ballast assembly that will maintain an equal distribution of weight on the front steerable wheels whenever the front axle is shifted laterally relative to the chassis.

It is a feature of this invention that the tractor front ballast assembly will shift with the movement of the axle relative to the chassis of the tractor.

It is an advantage of this invention that substantially uniform weight distribution of the ballast assembly on the front steerable wheels can be maintained whenever the front axle shifts laterally relative to the chassis.

It is another feature of this invention to provide a tractor ballast assembly having an aesthetically pleasing appearance.

It is still another feature of this invention that the tractor ballast assembly can be easily removed from the front axle of the tractor.

It is another advantage of this invention that the tractor ballast will be maintained at a central position between the front steerable wheels.

It is still another feature of this invention that a front tractor ballast can be provided with a greater mass at the remote forward end than at the rearward end mounted to the tractor.

It is still another advantage of this invention that the shape of the individual weights places a greater mass at the forward end of the weight.

It is yet another advantage of this invention that the center of gravity of the tractor weight is forward of the centerline of the weight.

It is a further advantage of this invention that the distance between the center of gravity of the mounted weight and the carrier on which the weight is mounted is increased so that the impact of the ballast is increased without increasing the mass of the weights.

It is yet another advantage of this invention that the mounting of the tractor ballast assembly on the front axle improves tire clearance during lateral shifting of the axle relative to the tractor chassis.

It is yet another feature of this invention that the tractor ballast assembly is mounted on an arcuate rack detachably affixed to the center of the front steerable axle.

It is a further object of this invention to provide a tractor ballast assembly cooperable with a laterally shiftable front axle, which is durable in construction, inexpensive of manufacture, carefree of maintenance, facile in assemblage, and simple and effective in use.

These and other objects, features, and advantages are accomplished according to the instant invention by providing a tractor having a front axle that pivotally moves laterally in response to a corresponding steering action of the steerable wheels mounted on the front axle wherein the ballast assembly is supported directly by the front axle so as to be laterally movable relative to the chassis with the shiftable front axle. The ballast assembly is formed by individual weights mounted on an arcuate rack detachably connected to the front axle. The individual weights are connected together by fasteners to form a unitary package positioned centrally between the steerable wheels.

BRIEF DESCRIPTION OF THE DRAWING

The advantages of this invention will become apparent upon consideration of the following detailed disclosure of the invention, especially when taken into conjunction with the accompanying drawings wherein.

DETAILED DESCRIPTION OF THE PREFERRED EMBODIMENT

Figure 1:
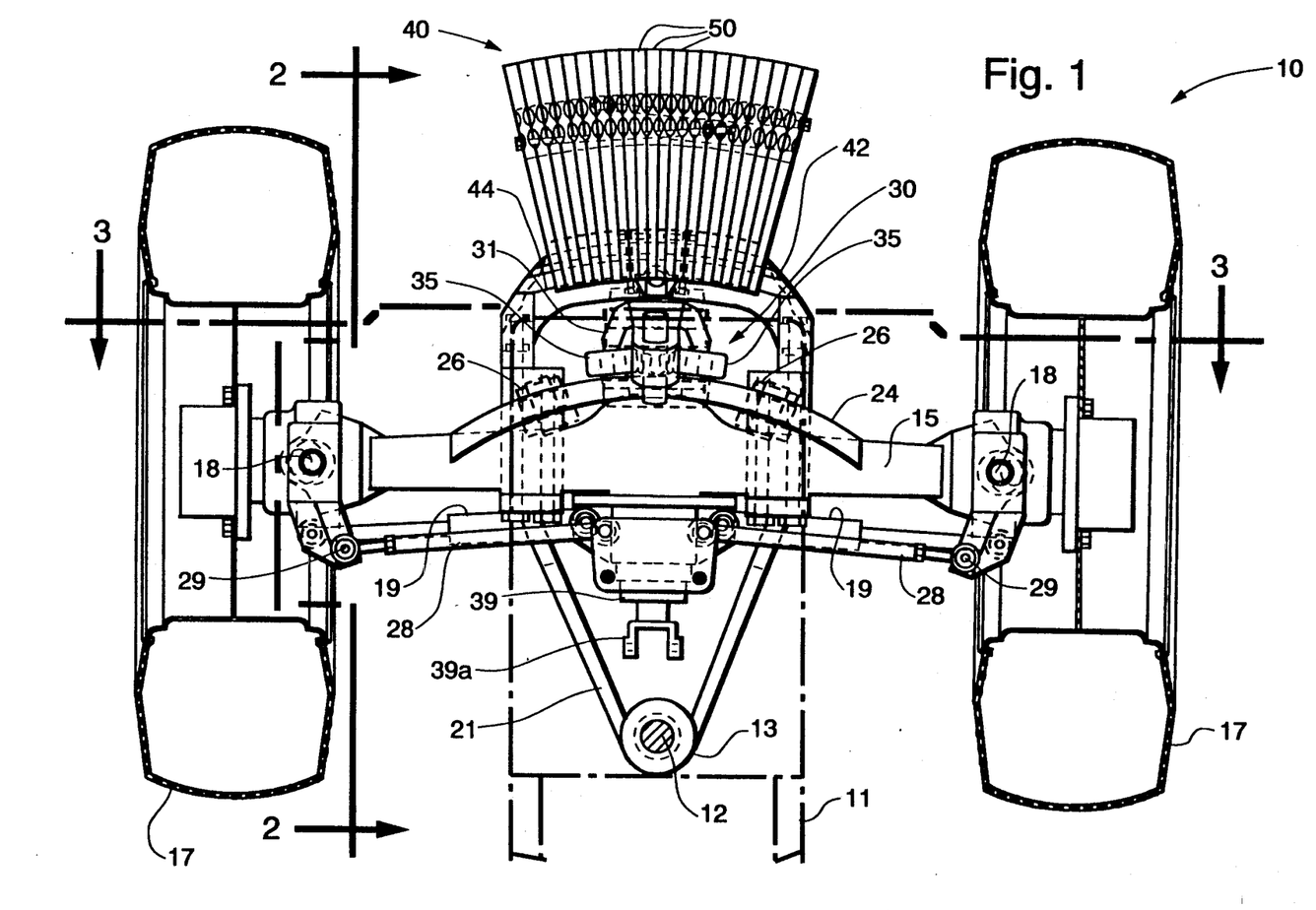
FIG. 1 is a top plan view of a front axle assembly for an agricultural tractor incorporating the principles of the instant invention, the front portion of the tractor chassis overlying the front axle assembly being shown in phantom.
Figure 2:
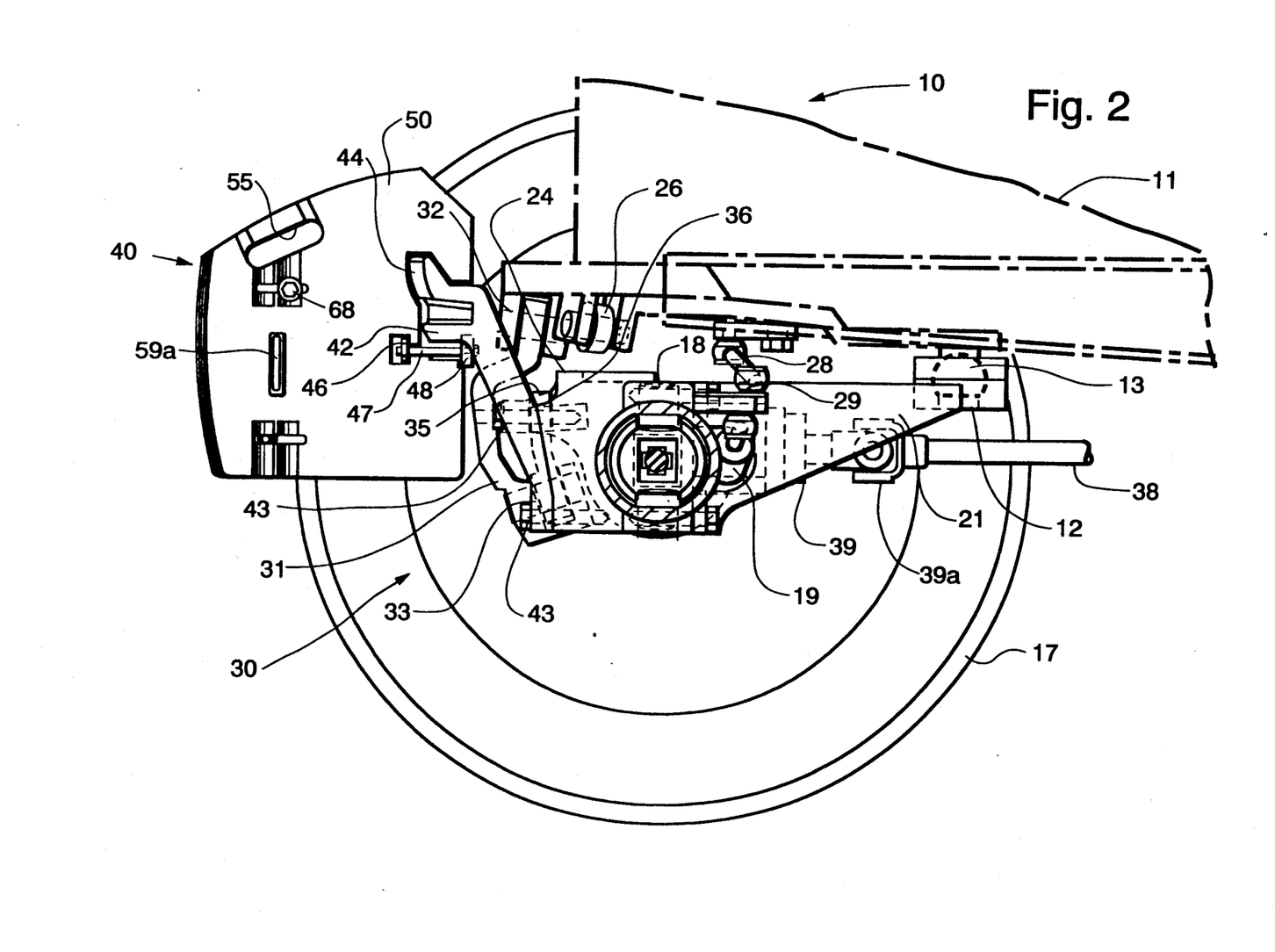
FIG. 2 is a cross-sectional view of the front axle assembly taken along lines 2—2 of FIG. 1, the front portion of the tractor chassis being shown in phantom relative to the front axle assembly.
Figure 3:
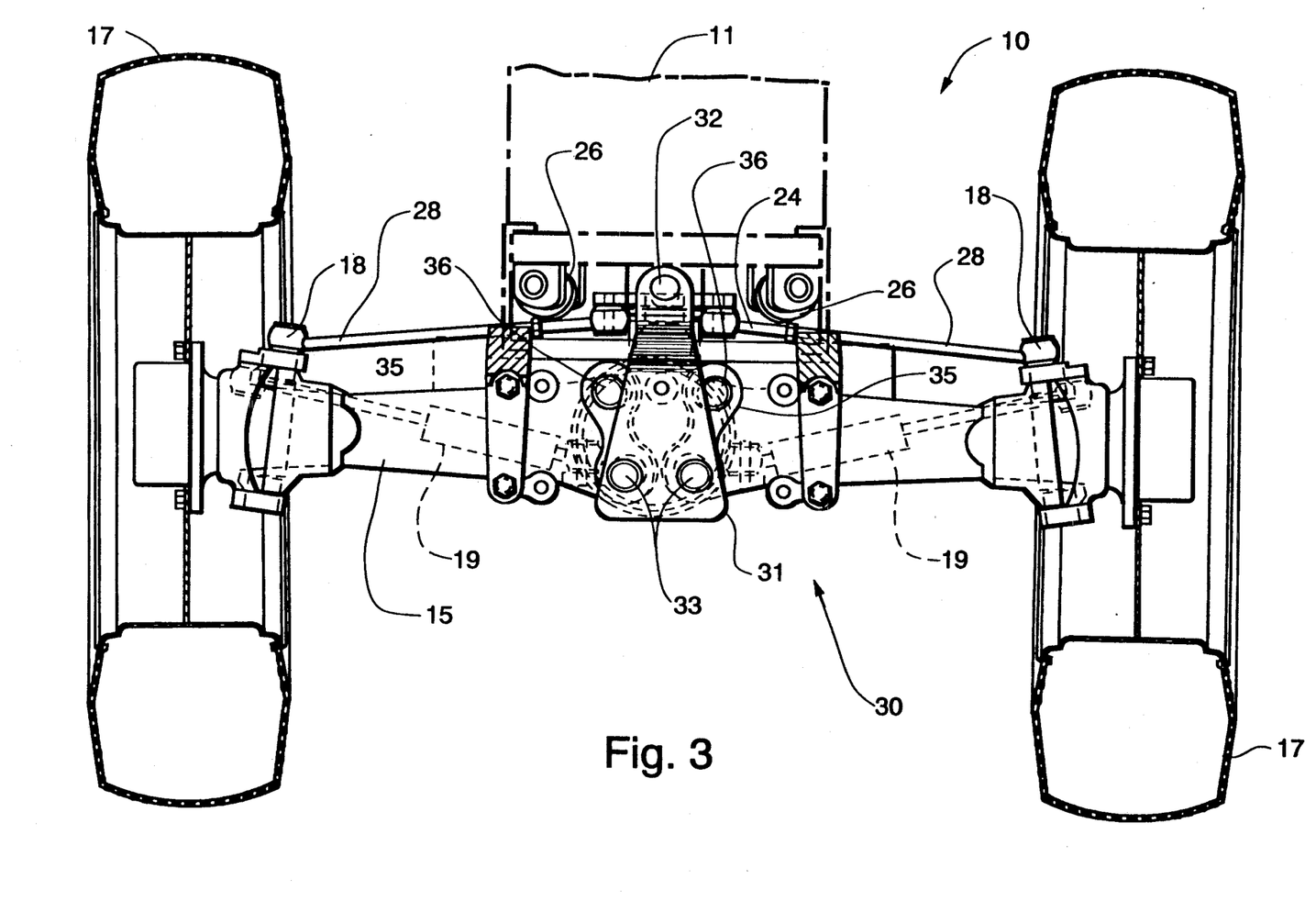
FIG. 3 is a cross-sectional view of the tractor front axle assembly taken along lines 3—3 of FIG. 1 to depict generally a front elevational view of the tractor assembly immediately rearwardly of the weights.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly 10 includes a transversely extending axle member 15 having pivotally mounted on the respective laterally opposing ends thereof a pair of steerable wheels 17 pivotable about respective nearly vertical axes 18 to effect a steering of the wheels 17 relative to the axle member 15. A pair of hydraulic cylinders 19 interconnect the axle member 15 and the steerable wheels 17 to control the pivotable movement of the wheels 17 relative to the axle member, and thereby, effect steering.

The front axle member 15 carries a rearwardly extending subframe metaber 21 which carries the vertical pivot 12 and ball joint 13 connected to the tractor chassis 11 rearwardly of the front axle member 15 yet positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature coincident with the pivot axis 12. The chassis 11 carries a pair of laterally spaced rollers 26 that are engageable with the arcuate track 24 when the front axle member 15 oscillates generally about a horizontal axis in response to changing ground contours and undulations so that the rollers 26 provide a limit to the vertical movement of the front axle member 15 relative to the tractor chassis 11 due to an engagement thereof with the arcuate track 24.

A pair of tie rods 28 interconnecting the chassis 11 and the steerable wheels 17 transmit steerable movement of the wheels 17 relative to the front axle member 15 and to a lateral shifting movement of the chassis 11 relative to the front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of the tie rods 28 interconnecting the chassis 11 and the wheels 17 at a connection point 29 spaced rearwardly from the respective pivot axis or king pin 18 for the corresponding steerable wheel 17, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

The front yoke assembly 30 has a contoured front strap member 31 pivotally connected at a first pivot 32 to the chassis 11. The front strap member 31 also carries a pair of lower pivots 33 for pivotally supporting a corresponding pair of dog bone-shaped links 35 which, in turn, are pivotally connected to the front axle member 15 by respective pivots 36. Each of the pivots 32, 33, 36 associated with the front yoke assembly 30 have a corresponding pivot axis aligned with the ball joint 13 forming a part of the pivot axis 12 between the front axle assembly 10 and the tractor chassis 11. Accordingly, the pivot axis for each of the five pivots 32, 33, 36 have a nonparallel relationship intersecting a common point at the ball joint 13. As a result, the pivotal movement of the front axle assembly 10 relative to the tractor chassis 11, resulting in a lateral shifting of the front axle member 15, is accomplished through a four-bar linkage which has substantially no vertical component associated with the movement thereof.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 15 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

In accordance with the principles of the instant invention, it can be seen in FIGS. 1-4 that the tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 50 are supported. Since the carrier 42 moves with the front axle member 15 relative to the chassis 11, the position of the ballast assembly 40 relative to the laterally spaced front wheels 17 remains relatively fixed, thereby maintaining a substantially constant weight distribution relative to the front wheels 17. Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 50 to increase the amount of ballast on the front axle 15 without decreasing the tire clearance below that which is acceptable for traditional tractors.

Figure 4:
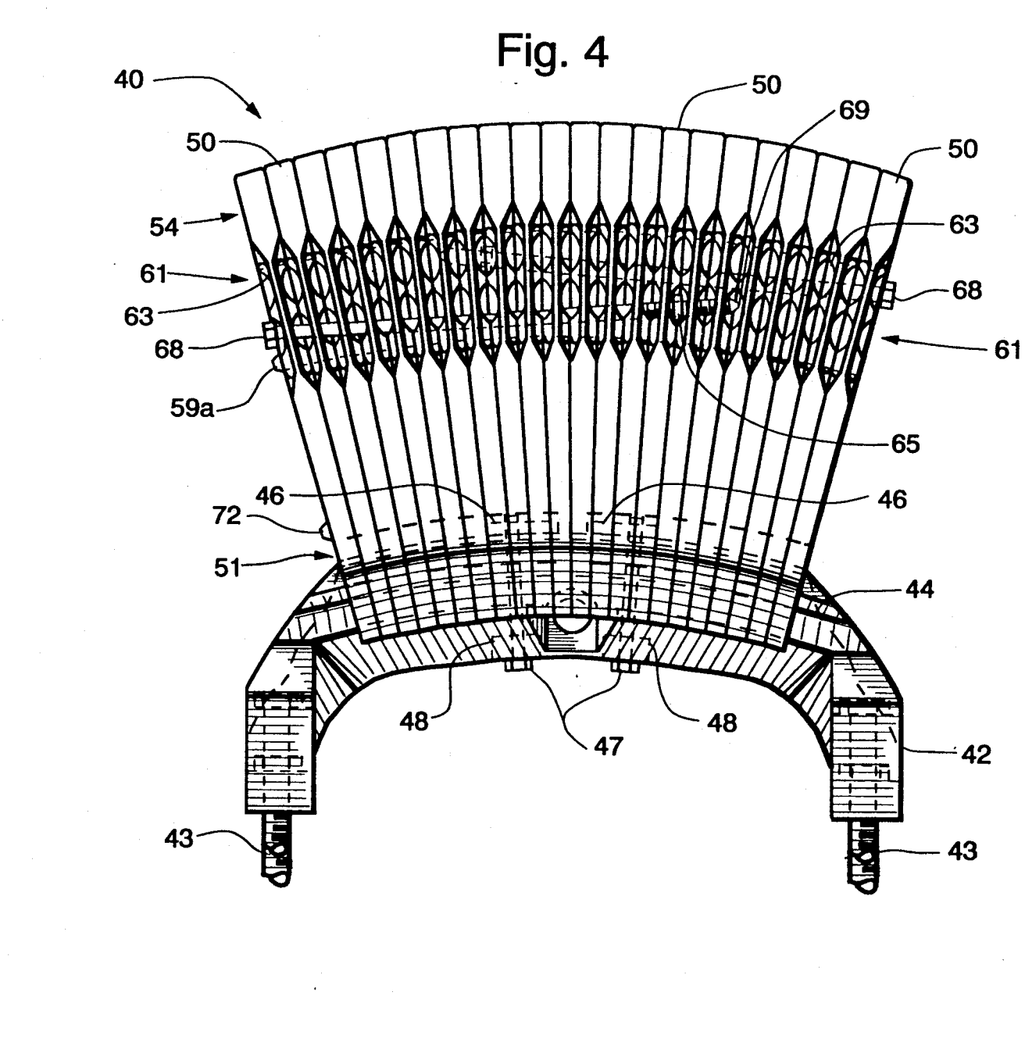
FIG. 4 is an enlarged top plan view of the tractor ballast assembly removed from the front axle of the tractor.
Figure 5:
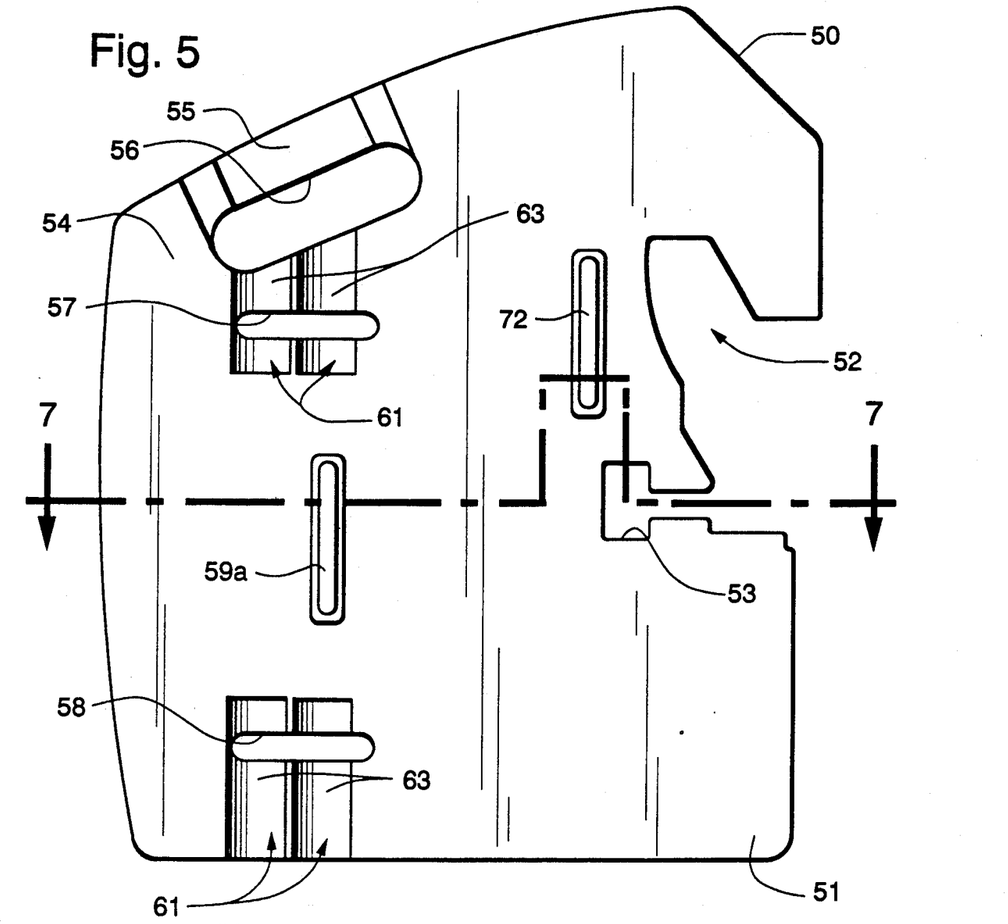
FIG. 5 is a side elevational view of a single suitcase weight forming a part of the tractor ballast assembly.
Figure 6:
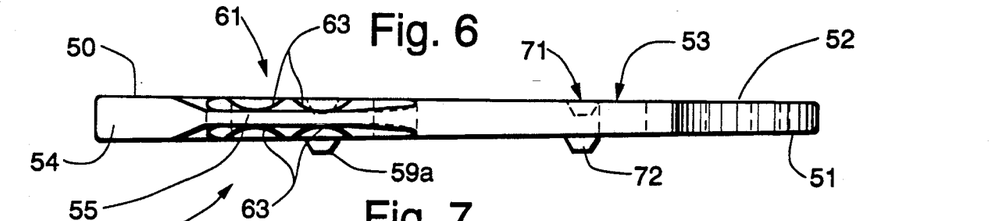
FIG. 6 is a top plan view of the suitcase weight shown in FIG. 5.
Figure 7:
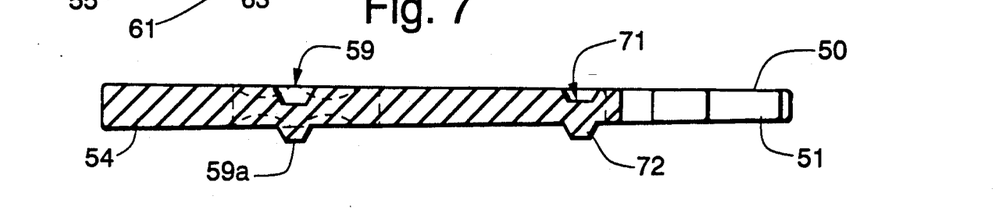
FIG. 7 is a cross-sectional view taken along lines 7—7 of FIG. 5 through the central portion of the suitcase weight.

The individual suitcase weights 50 are best seen in FIGS. 5-7. Each weight 50 has a rearward end 51 having a specially contoured opening 52 therein to correspond to the carrier 42 and mounting ring 44 to permit the weight 50 to be properly supported thereon. Each weight 50 is also provided with a forward portion 54 associated with a fastener mechanism to connect the individual weights together and form a unitary ballast package mounted on the carrier 42. As best seen in FIGS. 4, 6, & 7 the forward portion 54 of each weight 50 is thicker in cross section than the rearward portion 51 which, when mounted on the arcuate mounting ring 44, presents a laterally curved ballast assembly 40, best seen in FIG. 4. Accordingly, the forward portion 54 of each weight 50 has a greater mass than the thinner rearward portion 51 and, therefore, the center of gravity of each weight 50 is forwardly of the physical center of the weights.

Each individual weight 50 has a handle portion 55, including first opening 56 extending therethrough, to provide a handle by which the weight 50 can be grasped and carried from place to place. Each weight 50 is also provided with a transverse upper fastener opening 57 and a transverse lower fastener opening 58, both of which are in the form longitudinally extending slots. Each weight 50 is further provided with a detent 59 in one vertical face and a corresponding projection 59a on the opposing vertical face to provide a means for interlocking adjacent weights through the interengagement of the projection 59a on one weight into the corresponding detent 59 on the adjacent weight 50, when assembled into the ballast assembly 40. The contoured opening 52 in the rearward portion 51 of each weight 50 is provided with a rearward fastener opening 53 extending transversely through the weight to facilitate the mounting of an assembled plurality of weights 50 on the carrier 42 as will be described in greater detail below.

The weights 50 are also provided with a pair of adjacent vertically extending flutes 61 associated with each of the upper and lower fastener openings 57, 58 and incorporated into both sides of the weight 50. Each of the flutes 61 extend to the vertically nearest surface of the weight 50 to permit access to the interior of the ballast assembly 40, for purposes to be described in greater detail below. In the instances of the flutes 61 associated with the upper fastener opening 57, the handle portion 55 defines a recessed portion of the weight 50, as best depicted in FIG. 6, such that the flutes 61 need only extend to the handle opening 56 to provide sufficient access to the upper fastener opening 57. Each flute 61 has a vertically oriented arcuate surface 63.

Figure 8:
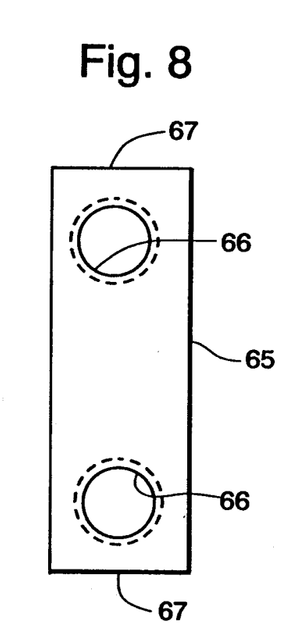
FIG. 8 is an enlarged detail view of the tapped fastener member cooperable with a threaded bolt to clamp the front tractor weights together.

Referring now to the detail view of FIG. 8, a fastener strip 65 used to clamp the weights 50 together can best be seen. The fastener strip 65 is an elongated metal strip having a pair of tapped holes 66 formed in the opposing ends 67 of the strip 65. The holes 66 are positioned relative to the respective ends 67 of the strip 65 such that the strip 65 can be inserted into the flutes 61 to position one of the holes 66 in substantial alignment with the corresponding fastener opening 57, 58. Each fastener strip 65 is provided with two holes 66 to provide greater flexibility in use of the strip 65, such that no particular care needs to be taken to insert the strip 65 into the flute 61 in the proper orientation, unless one of the holes 66 have been damaged.

To clamp the weights 50 together, preferably after the weights 50 have been supported on the carrier 42, a long threaded fastener 68 is inserted generally horizontally through the upper fastener opening 57 from one side of the ballast assembly 40 and threaded into the corresponding tapped hole 66 in a fastener strip 65 inserted downwardly through one of the flutes. The threaded fastener 68 is provided with a conical tip 69 to assist in seeking the hole 66 in the strip 65. The fastener 68 is then threaded into the tapped hole 66 until tightened. Because of the arcuate shape of the ballast assembly 40, the fastener 68 may not be able to extend entirely through the ballast assembly 40, depending on the overall size of the assembled weight package, requiring the insertion of the fastener strip 65 in a flute corresponding to an intermediate weight 50 in the ballast assembly 40. One skilled in the art will realize that the fastener must clamp together more than half the weights 50.

To complete the assembly of the ballast assembly 40, a second fastener 68 must be inserted through the upper fastener opening 57 from the opposite side of the ballast assembly 40 and engaged with a corresponding fastener strip 65, the two fasteners overlapping several weights 50 at the center of the ballast assembly 40. Similarly, a pair of fasteners 68 are inserted through the lower fastener opening 58 from opposing sides of the ballast assembly 40 to engage fastener strips 65 inserted upwardly into appropriate flutes 61. The utilization of four such fasteners 68 clamps the weights 50 together to form a unitary package.

The provision of an arcuate surface 63 for each flute 61 allows the fastener strip 65 and an appropriate washer associated with the head of the threaded fastener 68 to seek an equilibrium position in proper alignment with the fastener 68. The specific orientation of the fastener strip 65 relative to the arcuate surface 63 of the corresponding flute 61 will necessarily vary depending on the number of weights 50 clamped by the corresponding fastener 68. A full tightening of the fastener 68 may result in a coining of the fastener strip 65 and any washer used with the fastener 68 to match the shape of the arcuate surface 63.

Each weight 50 is also provided with a clamp opening 53, which may form a part of the contoured opening 52, extending generally horizontally through the weight 50. As with the upper and lower fastener openings 57, 58, the clamp opening 53 forms an arcuate passageway through the assembled ballast assembly 40. A clamping strip 46 laterally inserted horizontally through the passageway defined by the adjacent clamp openings 53 will position a tapped hole for engagement with a clamping bolt 47 positioned below the carrier 42. A clamping block 48 associated with the clamping bolt 47 can be utilized to better engage the carrier 42. Preferably, at least two clamping bolts 47 will be utilized to firmly clamp the assembled weights 50 to the carrier 42. Optionally, the clamping strip 46 can be a single arcuate strip having a pair of tapped holes therein for engagement with a pair of clamping bolts 47 to provide some cooperative relationship therebetween.

One skilled in the art will readily realize that a ballast assembly constructed of such individual weights clamped together will result in an arcuate-shaped ballast assembly with the larger forward portions being spaced away from the front axle. As a result the center of gravity of the ballast assembly will be spaced more forwardly than with conventional ballast assemblies to give a greater impact of the weights due to a longer moment arm between the center of gravity and the front axle. Accordingly, such a ballast assembly will provide a greater ballasting effect for each pound of weight. The arcuate-shaped ballast assembly also improves tire clearance because of the narrower width of the ballast assembly being adjacent the tractor where the tires would normally interfere with the ballast package.

It has been found that a better shipping of a group of individual weights can be accomplished by alternating weight orientation and binding the weights 50 together. As a result, the stacked individual weights 50 will not form an arcuate shape, but rather a linear one. As shown in FIGS. 5-7, each weight 50 can be provided with an optional second detent 71 and corresponding projection 72 formed in the rearward portion 51 forwardly of the contoured opening 52. As with the first detent 59 and corresponding projection 59a, the interengagement of a projection 72 with an adjacent detent 71 helps to stabilize the ballast assembly 40. By forming the second detent 71 and corresponding projection 72 in the body of the weight 50 at a position relative to the top and rear of the weight 50 to correspond to the position of the first detent 59 and first projection 59a relative to the bottom and front of the weight 50, the weights 50 stacked for shipment will have the first projection 59a received by the second detent 71 and, conversely, the second projection 72 received by the first detent 59, thereby making the most compact package possible for shipment. Furthermore, the vertical and horizontal staggering of the two projections 59a, 72 provides a better interlocking relationship between adjacent weights 50.

One skilled in the art will readily realize that the mounting of the weights directly to the laterally shiftable axle will enable the ballast to be maintained centrally between the front wheels of the tractor as it makes turns, effecting a lateral shifting of the tractor chassis relative to the front axle. One skilled in the art will also realize that this invention is not limited in use to agricultural tractors, but is applicable to any vehicle which can incorporate a laterally shiftable front axle and requires a detachable front ballast. The assembled weights form a ballast assembly having an aesthetically pleasing arcuate shape visually indicative of the lateral shifting of the axle and attached weights. The physical structure of each weight lends to the ease of assembling the weights and of mounting the assembled weights on the carrier and to the ease of shipping such weights.

One skilled in the art will further realize that the concept of mounting a ballast assembly as described above on the front axle of a conventional steering tractor will provide improved oscillation clearance, since the ballast assembly will be oscillating with the axle, and will also reduce loading on the conventional oscillation pins connecting the axle to the tractor chassis because the weight of the ballast package will be bearing directly on the front axle through its supporting structure, rather than through the oscillation pins.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a chassis; a transverse rear axle connected to said chassis and carrying a pair of laterally spaced ground engaging wheels; a transverse front axle connected to said chassis and having pivotally mounted thereon a pair of laterally spaced steerable wheels; steering means operably connected to said steerable wheels to control the pivotal movement thereof relative to said front axle; and drive means supported on said chassis for operatively powering said tractor, the improvement comprising:

said front axle being pivotally connected to said chassis for pivotal movement in a generally horizontal plane relative to said chassis;

control means operably interconnecting said steerable wheels and said chassis to effect pivotal movement of said front axle relative to said chassis in response to a corresponding pivotal movement of said steerable wheels; and ballast means supported on a rack member detachably affixed to said front axle to be pivotally movable therewith relative to said chassis.

2. The tractor of claim 1 wherein said ballast means includes a plurality of separable weights supported on said rack member.

3. The tractor of claim 2 wherein said ballast means is centrally positioned between said steerable wheels.

4. The tractor of claim 3 wherein said rack member positions said weights forwardly of said chassis.

5. The tractor of claim 4 wherein said rack member is arcuate, said weights being fastened together to form a unitary mass having an arcuate front face.

6. The tractor of claim 4 wherein said rack member is detachably connected to said front axle.

7. A tractor comprising:
   a chassis;
   a transverse rear axle connected to said chassis and carrying a pair of laterally spaced ground engaging wheels;
   a transverse front axle pivotally connected to said chassis for movement about a generally vertically extending pivot axis and having pivotally mounted thereon a pair of laterally spaced steerable wheels, said front axle being movable in a generally horizontal plane relative to said chassis;
   steering means operably connected to said steerable wheels to control the pivotal movement thereof relative to said front axle;
   control means operably interconnecting said steerable wheels and said chassis to effect pivotal movement of said front axle relative to said chassis in response to a corresponding pivotal movement of said steerable wheels;
   ballast means mounted on a rack member detachably connected to said front axle to be pivotally movable therewith relative to said chassis and to position said ballast means forwardly of said chassis; and
   drive means supported on said chassis for operatively powering said tractor.

8. The tractor of claim 7 wherein said ballast means includes a plurality of separable weights mounted on said rack member centrally between said steerable wheels, said weights maintaining a generally fixed position relative to said steerable wheels as said front axle and said weights move laterally with respect to said chassis.

9. The tractor of claim 8 wherein said rack member is arcuate, said weights being fastened together to form a unitary mass having an arcuate front face.

10. In a tractor having a chassis; a transverse rear axle connected to said chassis and carrying a pair of laterally spaced ground engaging wheels; a transverse front axle connected to said chassis to be movable relative thereto and having pivotally mounted thereon a pair of laterally spaced steerable wheels; steering means operably connected to said steerable wheels to control the pivotal movement thereof relative to said front axle; and drive means supported on said chassis for operatively powering said tractor, the improvement comprising:
   ballast means supported on a rack member detachably mounted on said front axle to be movable therewith relative to said chassis and to position and said ballast means forwardly of said front axle.

11. The tractor of claim 10 wherein said front ale is pivotally connected to said chassis, said ballast means being pivotally movable with said front axle relative to said chassis.

12. The tractor of claim 11 wherein said rack member positions said ballast means forwardly of said chassis.

13. The tractor of claim 12 wherein said front axle is pivotally connected to said chassis for pivotal movement in a generally horizontal plane relative to said chassis and wherein a control means operably interconnects said steerable wheels and said chassis to effect pivotal movement of said front axle in response to a corresponding pivotal movement of said steerable wheels, said ballast means pivotally moving with said front axle.

* * * * *